(No Model.) 2 Sheets—Sheet 1.
A. J. LUMSDEN.
REEL FOR MEASURING AND CUTTING CHEESE BANDAGES.
No. 331,803. Patented Dec. 8, 1885.
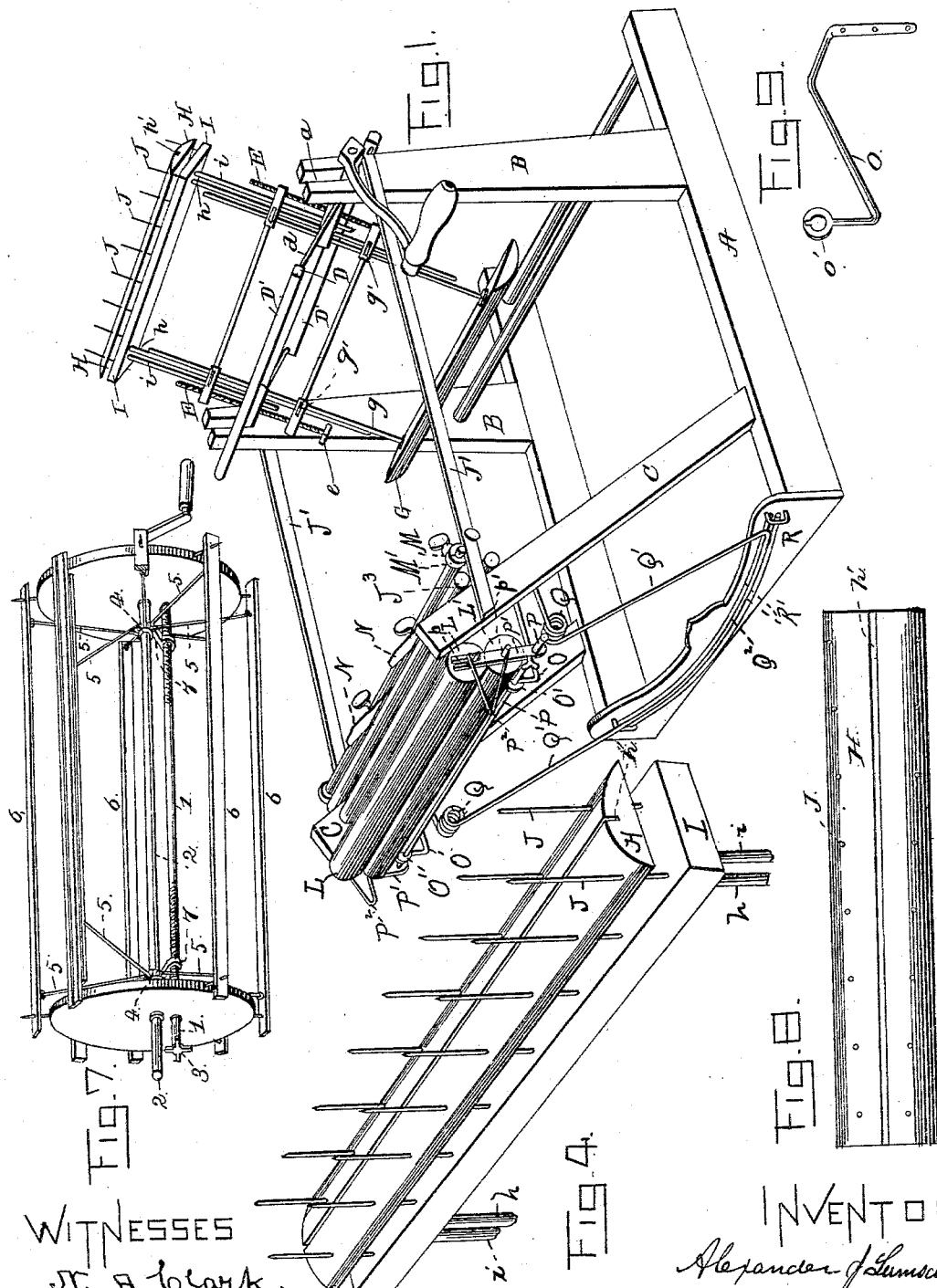
WITNESSES
JT. A. Clark.
P. B. Turpin.
INVENTOR
Alexander J Lumsden
By R. S. & A. P. Lacey
ATT'YS

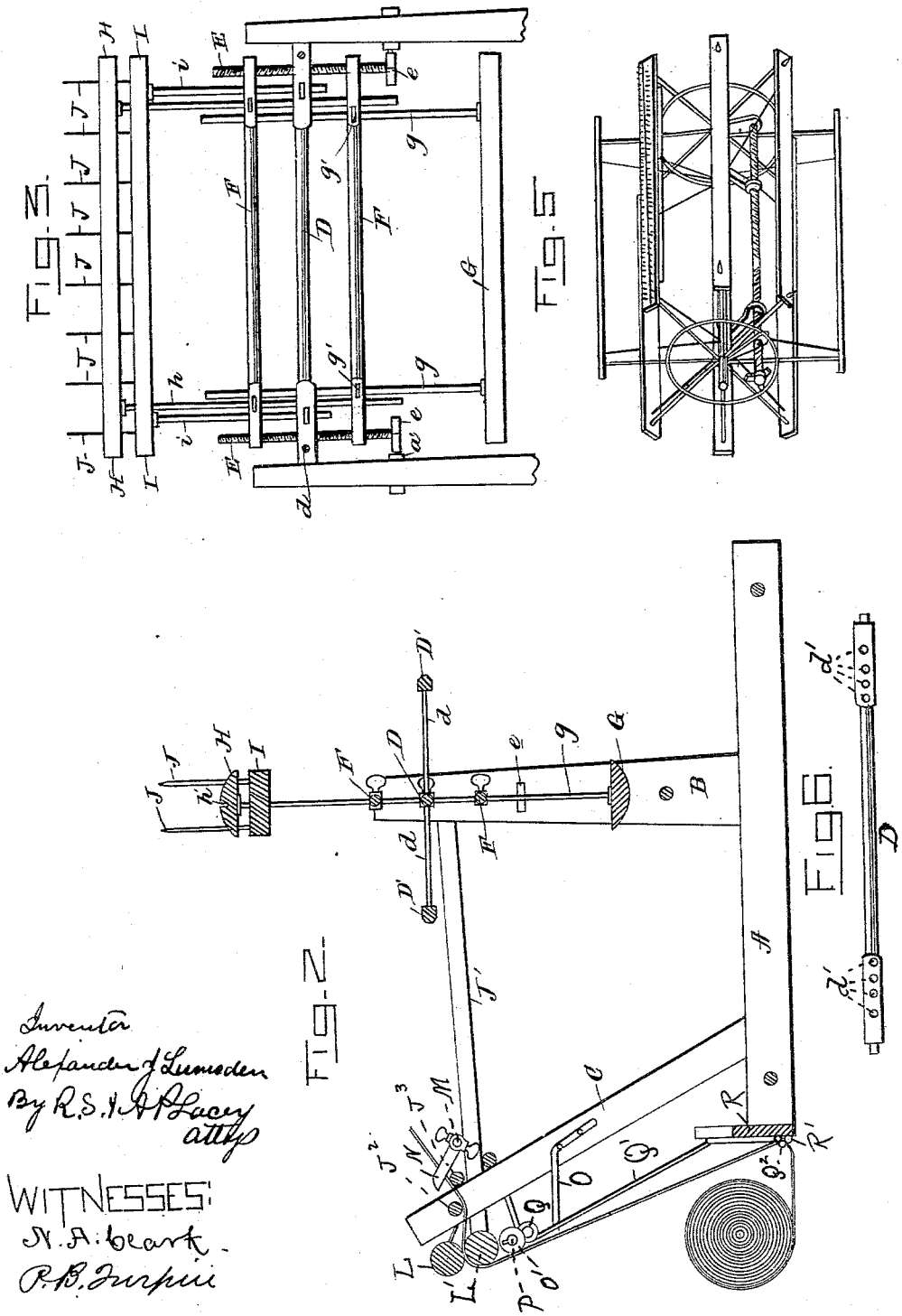

United States Patent Office.

ALEXANDER J. LUMSDEN, OF SHEBOYGAN FALLS, WISCONSIN.

REEL FOR MEASURING AND CUTTING CHEESE-BANDAGES.

SPECIFICATION forming part of Letters Patent No. 331,803, dated December 8, 1885.

Application filed July 2, 1884. Serial No. 136,615. (No model.)

*To all whom it may concern:*

Be it known that I, ALEXANDER J. LUMSDEN, a citizen of the United States, residing at Sheboygan Falls, in the county of Sheboygan and State of Wisconsin, have invented certain new and useful Improvements in Cheese-Bandage Reels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to machines for reeling, measuring, and cutting cheese-bandages.

It consists of a reel so constructed as to gradually decrease in circumference as the material is wound upon it.

It consists, further, in the marking and retaining bar having two sets of pins and an intermediate groove.

It consists, further, in other improvements, all of which will be hereinafter more fully described and claimed.

In the drawings, Figure 1 is a perspective view of a machine constructed according to my invention. Fig. 2 is a transverse section of same. Fig. 3 is a longitudinal section of the reel. Fig. 4 is a detail view of the marking-bar, and Figs. 5 and 7 show a different mode of carrying my invention into effect, as most clearly shown in Fig. 4. Fig. 6 is a detail view of the reel-shaft. Fig. 8 is a detail plan view of the marking-bar, and Fig. 9 is a detail perspective view of one of the brackets, all of which will be described.

In carrying out my invention I by preference employ base-bars A, on which, near one end, I mount standards B, and near their other ends standards C. The standards B have suitable bearings, *a*, for the shaft of the reel, and studs or pins *a'* are projected from the inner sides of said standards in position to engage the arms of the spur-pinion, presently described. The reel-shaft D is journaled at its ends in bearings *a*, and has rods *d d* extended radially from it, which rods support the bars D' on their outer ends, the said bars being arranged parallel to the shaft, as clearly shown. Through the shaft, near its opposite ends, I form transverse openings *d'*, four at each end, for the purpose presently described. Screws E E are journaled midway their ends in the outer ones of holes *d'*, and are provided with right-hand threads on one side of their journal in the shaft, and with left-hand threads on the opposite side, as most clearly shown in Fig. 3. These screws E turn through threaded openings in the adjusting guide-bars F, and are provided on one or both ends with spur-pinions *e*, the arms of which engage the pins *a'* on the standard, and partially rotate the screw as the reel is revolved.

It will be seen that the guide and bars F are arranged parallel to the shaft and to each other, and are simultaneously adjusted toward the shaft or away therefrom, as the screws are turned in one or the other direction, by engagement with the pins *a'*, from one or the other side, according to the direction in which the shaft may be rotated.

The slat G is provided with rods *g*, which extend from their inner side to the adjacent adjusting-bar, and are secured thereto, so the adjustment of said bar will work a corresponding adjustment of the slat. I by preference secure the rod *g* to the adjusting-rod by a set-screw, *g'*, and extend it inward through the shaft, and thence through the opposite adjusting-bar, so as to brace the latter and more securely hold the several parts in place. By securing the rods *g* to the adjusting-bar by set-screws it will be seen that they may be readily set out when it is desired to wind on a new length of cloth when turned in, and this may be repeated until the bars are brought against the shaft, when of course the direction of rotation of the shaft must be reversed, so as to move the slats out to their former position, as will appear.

The slat H is provided with rods *h*, which are disposed similarly to those of bar G, before described, and these two slats in winding the bandage are gradually drawn toward each other, so as to reduce the circumference of the reel at each revolution commensurate with the thickness of a single bandage, so the succeeding bandages may be measured the same length as each and all that have been wound on before. The slat H forms one section of the marking and retaining bar, the other section being the needle-carrier I, which has rods $i$ extended inward through the adjacent adjusting-bar and made fast to the shaft. This needle-bar is arranged parallel to and in diametrical line with the slat H, and has perforations, through which the rods of said slat extend. Needles J are projected radially outward from the bar I in two rows, and extend through suitable openings in the slat H. This slat is provided along its upper portion with a groove, $h'$, adapted to facilitate the cutting of the bandages. The needle-perforations are formed on opposite sides of grooves $h'$, and are preferably arranged, as are the needles, in diverging rows, as most clearly shown in Figs. 4 and 8, so they will perforate the cloth in such rows, in order that the bandage when joined at its ends shall have the desired tapered form. As the reel is revolved the slat H is drawn in, as before described, and, the needle-bar being fixed, the needles project farther through said slat at each revolution. It will be understood that when desired the slat-section could be fixed and the needle-bar caused to move outward, though I prefer to arrange the parts as shown.

The needles, it will be seen, serve the double purpose of holding the several layers of cloth and marking, by means of perforations, the stitching-line, whereby to join the ends of the bandages.

In the construction shown in Figs. 5 and 7 the adjusting-screw 1 is journaled alongside of and parallel to the shaft 2, and has on one end a spur-pinion, 3, suitably arranged to engage a pin or projection on the standard or support. This screw 1 is provided on one end with a right-hand thread and on its other end with a left-hand thread. Collars or rings 4 are sleeved on the shaft 2 near its ends, and have rods 5 extended from them and secured at their outer ends to the slats. Arms 7 are extended from the rings 4, and have threaded openings fitting on the threaded portions of the screw and moved back and forth thereon as the screw is revolved in one or the other direction. This, it will be seen, will move the rings 4 on the main shaft and cause the slats of the reel to move in or out, as may be desired.

In constructing the framing I preferably extend side bars, J', between the uprights and the standards near the upper ends of such parts. A transverse rod, $J^2$, connects the standards near their upper ends, and a similar rod, $J^3$, is extended between the bars J', adjacent the bar $J^2$, as shown most clearly in Fig. 2. The knife-support M is arranged between the guide-rods $J^2$ $J^3$ and the reel, and may be secured by clamps M' to the side bars, J', as shown. The knives N are secured to this support, and may be adjusted along the same, so as to cut the bandages or strips any desired width.

Brackets O, the construction of which is most clearly shown in Fig. 9, are secured at one end to the standards O and extend thence laterally inward and longitudinally outward, and have their other ends formed or provided with eyes or loops O', in which is supported a rod, P, which is movable longitudinally through the eyes or loops O', for the purposes presently described. Short uprights P' P' are mounted on the ends of the rod P, and are provided with bearings $p$ $p'$ for the rollers L L'. One corresponding pair of the bearings is elongated vertically, to permit the spring $P^2$, arranged about as shown, to give such rollers a tension toward each other. This tension serves to hold the cloth tight, so it will be properly cut by the knives. The cloth being carried through between rollers L L' is thence directed between rods $J^2$ $J^3$, which hold the cloth down close to the knives, so it will be cleanly cut in the operation of the machine. These rollers L L', it will be seen, are movable longitudinally with the rod P, on which they are supported by means of the uprights P'. This longitudinal movement is transversely to the direction of motion of the reel, and consequently to the length of the cloth or bandage. By this adjustment of the guides, which are preferably formed of the tension-rollers, as shown, the cloth in its travel to the cutters may be moved to one or the other side in order that the strips may be accurately cut of the desired width.

In order to give additional tension to the cloth I by preference use the spring-bail Q, the arms Q' of which are secured to the framing, and its bar $Q^2$ bears against a bar, R, and preferably in a groove formed by two wires, R'. The cloth passing under the bar $Q^2$ and being drawn thence is given a greater tension, insuring the proper cutting of the same and its being wound tightly on the reel, as is desirable.

The operation of my machine is simple and will, it is thought, be fully understood from the description before given.

When desired, the reel may be made so that a single circumference of same will be equal to two bandages, in which case it would be desirable to provide both slats with knife slots or grooves. It will also be understood that the adjusting-screw might be provided with spur-pinions on both ends, in which case it would be desirable, of course, to so graduate the threads that the proper adjustment of the slats would be secured. It will also be understood that instead of adjusting both slats or several slats a single one would give the desired result by moving it farther in or out at each revolution.

While I prefer to use but two adjusting-bars and form the guide and screw bearings in opposite ends of same, it is obvious these guides, &c., could be formed on separate bars, in which case there would be four parts. While this would dispense with the extended middle portion of the bars, and thus reduce the weight of the reel, I prefer to employ the construction shown, because of the greater firmness thereby given the machine.

While I design my machine especially for the measuring, reeling, and cutting of cheese-bandages, it is manifest that it could be used for measuring and cutting cloth for other and like purposes.

Having thus described my invention, what I claim, and desire to secure by Letters Patent, is—

1. A reel which decreases in diameter as the material is wound on it, substantially as and for the purposes set forth.

2. A reel having slats and provided with mechanism which draws the slats in as the reel is revolved, substantially as and for the purposes set forth.

3. In a machine for measuring and cutting cloth, the combination, with the slat, of the needle-bar, the former being adapted to be drawn inward and the latter being provided with pins, which are pushed outward from the slat as the material is wound upon the reel, substantially as set forth.

4. In a cloth measuring and cutting machine, the marking and retaining bar provided with two rows of pins and an intermediate knife-groove, substantially as and for the purposes set forth.

5. In a cloth measuring and cutting machine, the retaining and marking bar consisting of a fixed and an adjustable or movable strip, one of said strips being provided with pins projected through holes in the other bar, together with mechanism, substantially as shown, which gradually and continually advances the pins as the cloth is wound upon the reel, substantially as and for the purposes set forth.

6. The combination, with the reel, of the marking and retaining bar having two diverging rows of pins and an intermediate knife-groove, substantially as and for the purpose set forth.

7. In a machine for measuring and cutting cloth, the set-screw which actuates the reel contracting and expanding mechanism, provided with a spur-pinion, in combination with a stud or projection arranged in position to be engaged by the arms of said pinion, substantially as and for the purposes set forth.

8. In an adjustable reel, the combination of the slats, the shaft, the adjusting-bars arranged on opposite sides of the shaft, the set screw or screws journaled at about its middle point in the shaft and having its opposite ends turned through the adjusting-bars, and rods connecting the slats and adjusting-bars, substantially as set forth.

9. In an adjustable reel, the combination, with the shaft, the adjusting-bars, and the screws journaled in the shafts and having their ends turned through the adjusting-bars, of the slats having rods extended inward and detachably connected with the adjusting-rods, substantially as and for the purposes set forth.

10. In an adjustable reel, the combination of the shaft, the adjusting-bars, the feed-screws, the slats, and the rods extended therefrom through and secured to the adjacent adjusting-bar, thence through the shaft and the other adjusting-bar, substantially as set forth.

11. In an adjustable reel, the combination of the shaft, the slats having inwardly-projected rods, the adjusting-bars, the feed-screws, and the needle-bar sliding on the rods of one of the slats, and having projected from its inner side rods extended through the adjacent adjusting-bar and secured to the shaft, substantially as set forth.

12. The combination, in a slat-reel, with the shaft, of the adjusting-bars connected with and supporting the slats and the set-screws journaled at about their middle points in the shaft, and having their threaded ends turned through the adjusting-bars and adapted to be revolved, substantially as set forth.

13. The combination of the reel, the cutter-shaft arranged in front thereof, a plurality of cutters secured on said shaft and adapted to cut the cloth into longitudinal strips, and a tension device arranged in front of the knives, substantially as set forth.

14. The combination, with the reel and the cutters, of the guides, as L L', arranged in front of the knives and adjustable or movable transversely to the line of motion of the cloth or bandage, substantially as set forth.

15. The combination, with the reel, the knives, and the pressure-rollers, of the spring-bail having its cross bar or arm arranged to bear against a board of the framing, substantially as set forth.

In testimony whereof I affix my signature in presence of two witnesses.

ALEXANDER J. LUMSDEN.

Witnesses:
J. W. HANFORD,
G. A. ROBBINS.